Nov. 27, 1962 — L. L. NAGEL — 3,065,992
ADJUSTABLE LEG REST
Filed Feb. 20, 1961 — 2 Sheets-Sheet 1

Inventor
Lester L. Nagel
By his attorneys
Howson and Howson

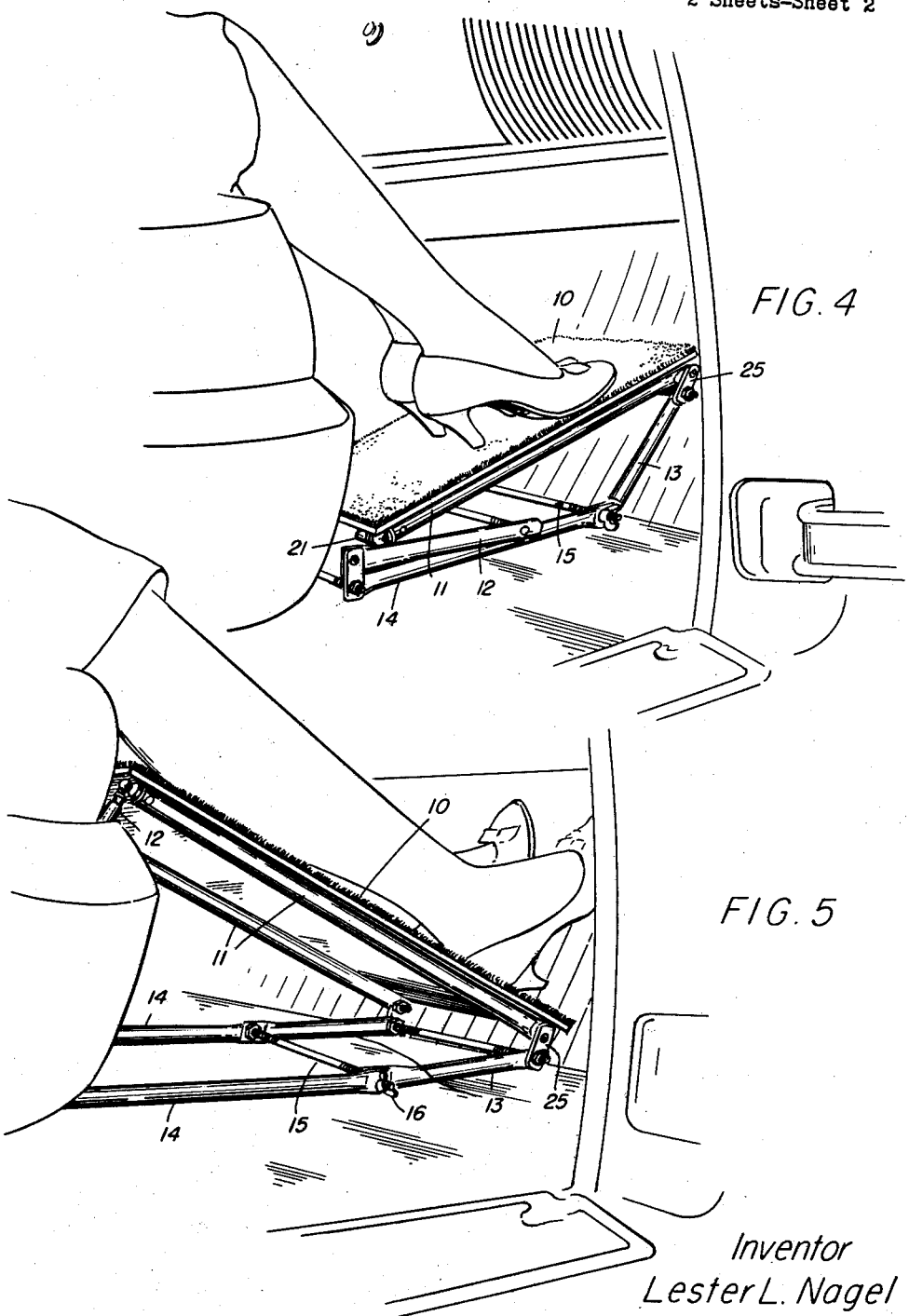

United States Patent Office 3,065,992
Patented Nov. 27, 1962

3,065,992
ADJUSTABLE LEG REST
Lester L. Nagel, 54 Dale Drive, Summit, N.J.
Filed Feb. 20, 1961, Ser. No. 90,524
8 Claims. (Cl. 297—439)

This invention relates to an adjustable leg rest and more particularly one which may be used in different adjustments in an automobile or can be self-supporting for use with a chair. When a passenger carrying vehicle is being driven a long distance, the passenger beside the driver frequently feels the need of a rest for her legs. It is one of the objects of the present invention to provide a leg rest which may be collapsed and put under the seat, to provide a low support for the feet sloping upward toward the front of the car or a seat-high support sloping up in the rearwardly direction. The device also can be adapted as a rest used independently of the car with a chair if so desired. It is characteristic of the leg rest that the surface on which the person's legs rest is supported at least on each side by a quadrilateral or four-sided structure in which each side or face of the quadrilateral is hinged to its neighbors and lengths of the sides are coordinated wtih detachability of one of the hinge joints to obtain the desired results. Simple hand operated means can be provided to make the device self-supporting whenever desired.

In the drawings FIGURE 1 is a perspective view of a leg rest built in accordance with the invention shown in compact collapsed position ready to be pushed under the seat of the automobile out of the way.

FIGURE 4 is a perspective view of a leg rest in a car providing a low support sloping upwards.

FIGURE 5 is a perspective view of a leg rest providing a high support sloping downwards toward the front, this being an alternate setting to that shown in FIGURES 2 and 4.

Figure 1:
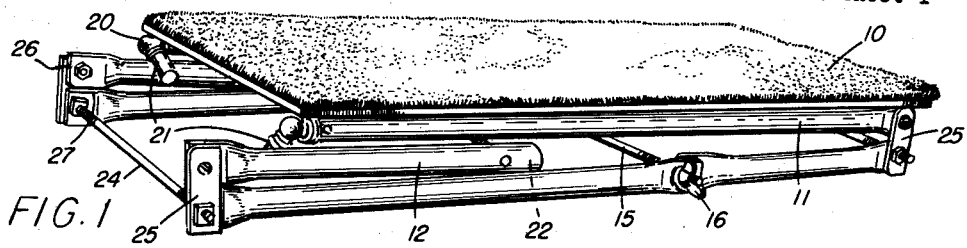

The leg rest has a surface or support 10 for a person's legs. This surface or support may be a cloth or a padded board as desired. The novelty of the leg rest lies principally in the supporting means for the support itself. The supporting means shown is essentially in the nature of a quadrilateral which is open in the sense that the sides are not pivoted in crossed positions. There is a four-sided quadrilateral structure on each side or edge of the leg support 10 itself. Each quadrilateral therefore supports the longitudinal edge of the element 10 on which the person's foot or leg rests. The quadrilateral consists basically of four rigid sides or pieces. A top piece 11, two end pieces 12 and 13, and a bottom piece 14. The top piece 11 is longer than the bottom piece 14 and the end piece 12 is longer than the end piece 13. The four main pieces of each quadrilateral are hinged togther, i.e. each side or piece is hinged to the two adjacent pieces with the lengths arranged as described. It will be seen that in FIGURE 2 an assembled relationship is shown in which one end of the support 10 will be higher than the other providing a leg surface sloping downward away from the chair or seat if the longer end is adjacent to the chair or seat. In a passenger-carrying vehicle, of course, this means the construction shown in FIGURE 2 provides a high sloping rest for a person's legs as shown in FIGURE 3 or in FIGURE 5. In addition to this high setting sloping downwardly away from the chair or seat, the leg rest can provide a low rest for the feet sloping in the opposite direction. This is shown in FIGURE 4. To place the leg rest in this setting, the connection between the top piece 11 underlying the surface board 10 and the longer end 12 can be broken, i.e. the two pieces are detached from each other. When detached, this part of the leg rest can be collapsed as shown in FIGURE 4. When the leg rest is not needed and is ready to be put out of the way, the entire device can be flattened out as shown in FIGURE 1 and will occupy only a minimum of space.

One of the features of the construction is its adaptability to having the shape of the quadrilateral generally immobilized. This can be accomplished either by the surface on which it is resting externally, or by means for clamping one of the hinged joints so that the angle which it forms is substantially rigid by virtue of means within the leg rest itself. In the construction shown in the drawing, the locking means to provide immobilization are provided at the point between the bottom piece 14 and the short end piece 13. This means is hand operated and locks the angle or leaves it free as desired. The means shown comprise a threaded rod 15 extending across from one quadrilateral to the other with lock nuts 17 and thumb nuts 16 provided on both sides so that the ends of the two adjacent pieces in each quadrilateral can be clamped together. By this clamping of the pieces together, the hinge can be immobilized as desired. While the shorter end piece 13 in FIGURES 2 and 3 shows the hinges between bottom piece 14 and short end piece 13 immobilized by virtue of the locking means just described, in FIGURE 4 the immobilization is obtained externally and the locking means are loosened so the hinge is free to conform to the surface the device is resting on. In FIGURE 4 the device is being used wtih short side piece 13 on the front floor board sloped upwardly. With this arrangement the short side pieces 13 conform to the angle of the front sloping floor board, the threaded rod 15 is located at the juncture between the floor board and the adjacent horizontal floor board and the bottom piece 14 lies horizontally on the floor boards. The angle 19 between the bottom and short end piece 13 is by conformity of the device at the hinge at the angle formed by the floor boards. The device can also assume the position shown in FIGURE 5 in the same manner. It is realized that in the ordinary car many passengers' legs are not long enough to reach the sloping floor boards and the leg rest provides a closer rest for them.

Figure 2:
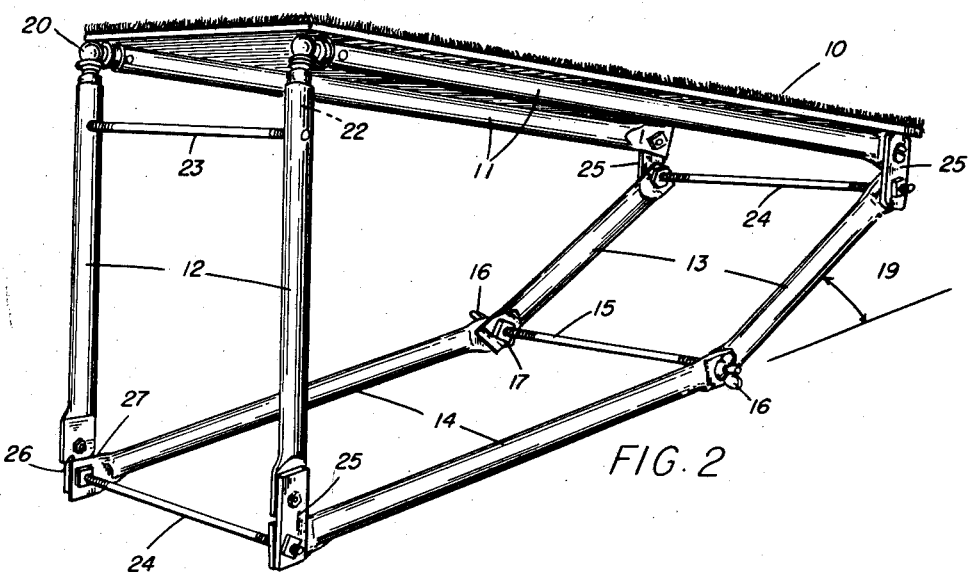
FIGURE 2 is a perspective view of the same device assembled to provide a seat-high rest sloping downwardly away from the seat. In this view the device assumes a slope consistent with the short side of the quadrilateral resting against a sloping surface such as a floorboard of a car or self-supported.
Figure 3:
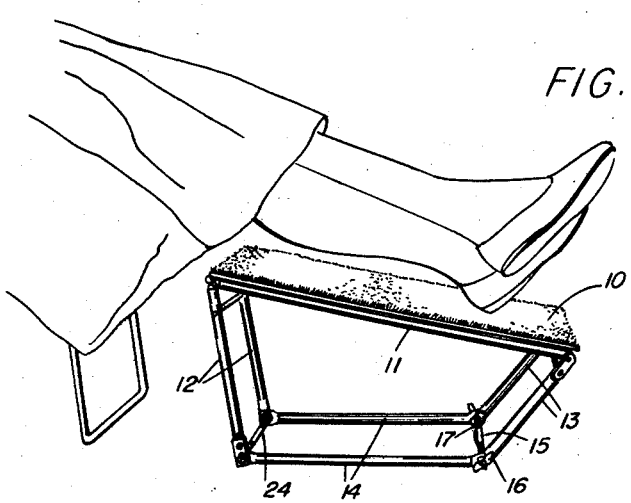
FIGURE 3 is another view of a leg rest in a setting similar to FIGURE 2 showing the rest being used with a separate chair in a self-supporting manner.

The detachable construction at the hinge between the top piece 11 and the long end piece 12 can be seen best in FIGURES 1 and 2. It will be seen that there is a hinge knuckle 20 for each quadrilateral in the end of the top piece 11 and that this terminates in a pintle 21. The end of the long end piece 12 is hollowed out at 22 to receive the pintle. In actual practice there seems to be no necessity for locking the pintle 21 and hollow end 22 together though this can be done if desired.

Cross rods 23 and 24 can be provided at any desired point to keep the two or more quadrilaterals spaced apart at the proper distances. In the drawings is shown rod 23 located intermediate the ends of the two long end pieces 12, and rods 24 as part of the hinges between the long end pieces 12 and bottom piece 14 and between the short end piece 13 and the top piece 11. These last two rods 24 function both as spacers and part of the hinged mechanism, the rods being passed through flattened ends of the bottom pieces 14 and end pieces 13 respectively.

As can be seen in FIGURES 1 and 2, in order to get the simple structure to occupy minimum space when collapsed, it has been found desirable to provide links 25 between the top piece 11 and the short end piece 13 and between long end piece 12 and the bottom piece 14. Thus each piece of the quadrilateral has such an extra link at one end. These links are pivotally connected to the end of each adjacent piece of the quadrilateral so that there is swivelling at two points at the linkage. At one point, the swivelling is about a tierod 24, at the other it is swivelling about the end of the other side of the quadrilateral at that hinge point. This compact arrangement facilitates immobilizing all angles between the pieces of the quadrilateral. In the construction shown in the drawings, the four pieces of each four-sided figure is shown made of rods or tubular material flattened where the hinge joints occur except at the hinge between the top piece 11 and the long end piece 12 which has been heretofore described.

It will be noted from FIGURES 1 and 2 that the lower edge 26 of the flattened ends of the long end pieces 12 are located only a short distance from the side 27 of the flattened end of the bottom piece 14 when the device is collapsed as shown in FIGURE 1. The corner of this edge 26 of the top piece 11 facing the end of the bottom piece 14 when the device is collapsed is rounded at one corner to permit collapse of the device, but this end surface of the longer end piece is not rounded at the upper corner in the collapsed position. It can be seen best in FIGURE 2 when the quadrilateral is set up with the four hinges connected. The side surface 26 of the long end piece 12 and the side surface 27 of the bottom piece 14 come together and limit the extent to which the long end piece can be pivoted outwardly toward the seat or chair. The limited position permitted by these two surfaces 26 and 27 can be seen in FIGURE 3.

These surfaces do not limit the shape of the quadrilateral as far as concerns pivoting of the long end piece relative to the bottom piece in the other direction. As already suggested, this can be seen in FIGURE 5 where the short end pieces 13 are parallel to the bottom pieces 14 and the angle formed by the bottom pieces 14 and the long end pieces 12 is appreciably less than 90°.

It will be seen that the adjustable leg rest is simple. It has the advantages of the open four sided figure to provide a rest that can be compactly collapsed and placed out of the way as shown in FIGURE 1, provide a low foot rest as shown in FIGURE 4, or provide a high leg rest as shown in FIGURES 2, 3 and 5. The device can be immobilized at one of its hinged joints either by virtue of the construction within the rest itself, or by virtue of the surface on which it rests, it being particularly useful for passengers on long trips by providing a surface sloping away toward the front, but nearer the seat than the sloping floor board.

What is claimed is:

1. An adjustable leg rest according to claim 7 in which the means for immobilization of one of the bottom hinges comprises a threaded rod, lock nut and wing nut by which these two pieces of the hinge between the bottom piece and the shorter end piece in each quadrilateral can be secured together in a permanent position.

2. An adjustable leg rest according to claim 5 in which the means to permit detachment of the top from the longer end pieces of each quadrilateral comprises a hollow space in the top end of the longer end pieces of each quadrilateral accommodating a pin hinged to the adjacent end of each top piece.

3. An adjustable leg rest according to claim 5 in which the pieces of each quadrilateral are of tubular metal stock and the hinged connections at one end of the bottom piece and the opposite end of the top piece include an extra link to allow for the compact collapse of the entire rest by detachment of the top from the longer end piece.

4. An adjustable leg rest according to claim 3 in which the linkages at one end of the bottom piece and at the other end of the top piece of each quadrilateral provide straight contacting surfaces on the side of one piece and the end of the adjacent piece, the surfaces being so spaced as to limit the angle through which the linkage can swing in one direction and the linkage being sufficiently loose to permit the device to swing freely in the opposite direction when the top piece and the longer end piece are detached.

5. An adjustable leg rest comprising a leg rest board in combination with two quadrilateral hinged structures each supporting the board throughout the length of the board, said board being inflexible from end to end, each supporting structure having a top piece, a bottom piece, the top longer than the bottom, and two side pieces one longer than the other, the shorter side piece of each quadrilateral when added to the bottom piece being longer than the top piece, and means making said longer side pieces detachable from an adjacent piece at one end whereby the leg board forms a high leg rest sloping in one direction or a low rest sloping in the other direction when the longer side piece is detached and the top and bottom pieces moved together.

6. An adjustable leg rest comprising a leg rest board, two quadrilateral structures hinged at each corner supporting the board in a longitudinal direction, said board being inflexible in the lengthwise direction, each supporting structure having a top piece, a bottom piece, the top being longer than the bottom, and two side pieces one longer than the other, each shorter side piece plus the bottom piece being longer than the top piece, said longer side pieces being detachable from the adjacent top piece at a point not intermediate the ends of the leg board, in combination with locking means adapted to immobilize the angle between the bottom and shorter end pieces; whereby the leg rest can be made self-supporting or not as desired, can form a high rest sloping toward the short end piece, a low rest sloping in the opposite direction or collapsed for storage.

7. An adjustable leg rest according to claim 6 in which the locking means are hand adjustable to give various angles of the pieces; whereby the other hinged joints can be immobilized in various positions.

8. An adjustable leg rest according to claim 6 in which there is a link between the top piece and the short end piece to facilitate compact changes of angle between the pieces.

References Cited in the file of this patent

UNITED STATES PATENTS

| | | |
|---|---|---|
| 2,341,080 | Burkholder | Feb. 8, 1944 |
| 2,375,225 | Herbert | May 8, 1945 |
| 2,581,110 | Kenworthy | Jan. 1, 1952 |
| 2,735,480 | Mead | Feb. 21, 1956 |
| 3,007,739 | Delia | Nov. 7, 1961 |